April 19, 1955  P. D. BABCOCK  2,706,643

RETRACTABLE HANDLE

Filed Jan. 29, 1953

INVENTOR.
PEARL D. BABCOCK
BY
Lindsey and Prutzman
ATTORNEYS

United States Patent Office 2,706,643
Patented Apr. 19, 1955

2,706,643

RETRACTABLE HANDLE

Pearl D. Babcock, Windsor Locks, Conn., assignor to The George P. Clark Company, Windsor Locks, Conn., a corporation of Connecticut Application January 29, 1953, Serial No. 334,011

4 Claims. (Cl. 280—47.37)

This invention relates in general to handle devices, such as those used on manually propelled trucks or dollies, and pertaining more particularly to a handle that may be readily adjusted into a number of different angular positions.

In the handling of material that must be shifted from one work station to the next or to a point of storage, as is the situation in numerous factories and warehouses, widespread resort has been made to the hand operated type of dolly upon which the material is transported to the desired locations. Desirably, any handle mechanism employed on these dollies should permit the dolly or truck to be either pushed or pulled in a manner that will allow the wheeled truck to be maneuvered around various obstacles with a minimum of human exertion. Also, certain safety precautions must be observed in the design of any such handle.

Accordingly, an important object of the invention is to provide a handle mechanism that may be moved into a number of adjusted and effective angular positions for both facile pushing or pulling the truck when either in close quarters or when traversing an obstructed route. In this connection, it will be recognized that when the truck is to be maneuvered in confined spaces, such as around machinery or in congested aisles, it will not be necessary to lower the handle, as the truck may be guided and propelled with the handle in a fully raised or partially raised position. On the other hand, when sufficient clearance does exist and the truck is to be pulled over a course of some length, the handle may be lowered to an optimum pulling position so that the person doing the pulling will not be troubled with his heels striking the truck, as would be the situation if the handle were designed only for maneuvering the truck in close quarters where the handle must remain substantially vertical, as above alluded to.

Still further, by means of the envisaged handle, the truck may be rocked so as to cause the truck to face in a different angular position, if need be, without imparting longitudinal movement of the truck.

Another object of the invention is to prevent the handle from being moved into a position so proximate any stacked articles being carried on the truck that a person's hands might be endangered when pushing the dolly, provision being made for preventing the handle from assuming an exact vertical position.

A further object of the invention is to render it impossible for the handle to contact the floor, provision being made for holding the handle at an angle of approximately thirty degrees so that the handle will not be inadvertently tripped over.

Another object is to provide a handle that with a slight upward movement will return to a locked, substantially vertical, out-of-the-way position after the truck has reached its destination.

A still further feature resides in the provision of a handle of the foregoing character that cannot be removed after it has been assembled with the truck chassis.

Other objects will be in part obvious, and in part pointed out more in detail hereinafter.

Figure 1:
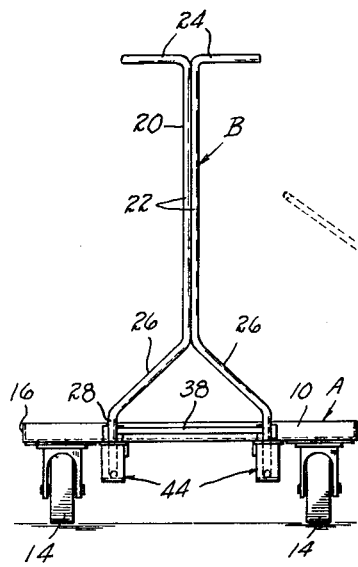
Figure 1 is an end view of a dolly or truck equipped with my handle mechanism.

Referring in detail to the drawing, the particular truck or dolly selected for illustrating the invention bears the reference letter A and comprises a chassis 10 equipped with a pair of rear casters or wheels 12 and a front swivel pair 14. The chassis, of course, may assume a preferred construction, but in the present instance includes a rectangular frame 16 composed of metallic angle members interconnected at their ends, the frame carrying a material supporting platform 18 composed of a series of interfitting wooden planks.

The angularly adjustable handle mechanism, which is the crux of the invention, has been designated in its entirety by the letter B. Included as part of this mechanism is a unitary handle member 20 comprising a pair of attached rods 22 terminating at one end in oppositely directed hand grip sections 24 and diverging apart in advance of their other ends to form a pair of spreading arms 26. Each arm 26 includes a shank 28 and a substantially U-shaped lower end having a pair of spaced legs 30, 32 and a connecting bight 34, the leg 30 actually being merely an extension of the shank 28. Bracing each leg 32 with respect to the other leg 30 may be a gusset strip 36. The strip 36 is solely for the purpose of reinforcing the legs 30, 32 with respect to each other and may be easily welded into place after assembly of the handle into an operable position, as will soon be fully understood. Further, reinforcing is desirable with respect to the arms 26 and to this end a strut or rod 38 may be welded between the shanks 28.

Since the invention has been exemplified by picturing a handle member 20, in effect bifurcated at its lower end, quite obviously each U-shaped extremity requires duplicate cooperating means for obtaining the various angular positions of the handle member. Accordingly, it is thought necessary to describe only one such means. To this end a pull plate 40 is suitably secured, as by welding, to the underside of the frame 16, projecting therefrom in cantilever fashion. Provided in the projecting end is an aperture 42 which encircles the leg 30, this aperture being countersunk at each end to allow the leg 30 to assume a multiplicity of angular positions with respect to the axis thereof.

Anchored to the lower face of the plate 40 is a bracket 44 composed of a horizontal portion 46 which is the part affixed to the plate 40 suggestively by welding, a lower curved portion 48 and diverging leg portions 50, 52 extending upwardly and away from each other, the leg portion 50 merging into the horizontal portion 46 at one end and the curved portion 48 at the other, whereas the leg portion 52 has connection only with said curved portion.

Figure 2:
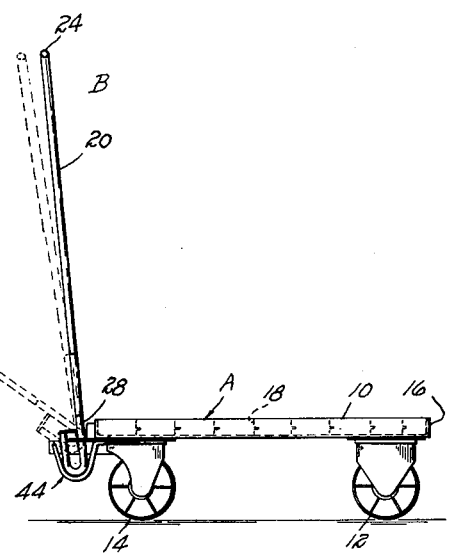
Figure 2 is a side elevational view corresponding to Figure 1, the handle being shown in several illustrative positions.

The purpose of the curved portion 48 is to cradle the bight 34, and accordingly its radius of curvature is slightly greater than that of the bight. The function of the leg portions 50 and 52, however, is to produce a wedging action against the bight 34 so that the handle member 20 may be used in either pulling or pushing the truck A, the pulling position depicted in Figure 3 involving the engaging of the portion of the bight 34 neighboring the leg 30 with the lower region of the leg 50. Although not illustrated in detail, the portion of the bight nearest the leg 32, when the truck is pushed, would ride into engagement with the lower region of the leg 52, such a condition corresponding to the upper dotted position of the handle as shown in Figure 2. Since the handle member 20, under these assumed conditions fulcrums about the pull plate 40, the degree of divergence of the legs 50 and 52 must be somewhat less than that of tangents drawn to the ends of the arc traversed by the bight 34 as the handle is pivoted. An arrangement with the handle mechanism B constructed to a scale proportional to that shown in Figure 3, having each leg portion 50, 52, form an angle of ten degrees with the vertical, i. e. an included angle of twenty degrees, has been found quite satisfactory in actual operation.

Figure 3:
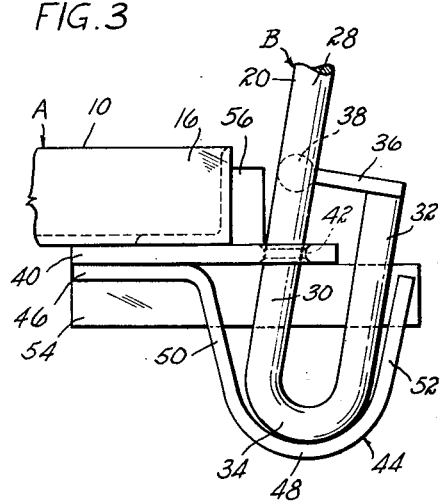
Figure 3 is an enlarged fragmentary detail view showing the solid line position of the handle depicted in Figure 2.

In order to avoid crushed fingers when pushing the truck with the handle in its most vertical position, as shown in solid outline in Figures 2 and 3, the aperture is disposed to the left of the center of curvature of the curved portion 48, this being necessary due to the U-shaped configuration of the handle ends, but not sufficiently far to the left to permit the handle to reach a true vertical position, an angle of five degrees having been found desirable. In this way, the hand grip sections 24 will be spaced a reasonable distance from any material that might be stacked to such a height on the platform 18. To strengthen each bracket 44, a gusset member 54 is employed, it being welded to the plate 40 and to both legs 50 and 52, thereby lending support to the otherwise unsupported free end of said latter leg.

Figure 4:
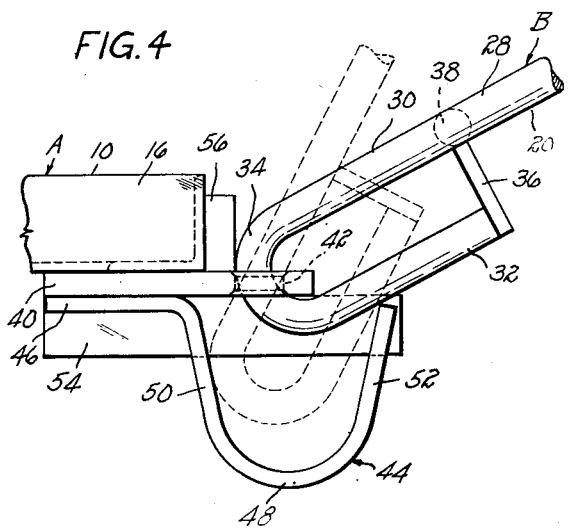
Figure 4 is a view similar to Figure 3, but with the handle shown in the lower dotted line position of Figure 2, the dotted outline position of this figure being one intermediate the solid line position here depicted and that illustrated in Figure 3.

The phantom position of the handle shown in Figure 4 illustrates one of the intermediate positions possible with the handle. In this particular position, the action is the same as in Figure 3 when pulling, for the bight 34 has merely been raised sufficiently by lifting the entire handle so as to engage the leg 50 at a higher elevation, the leg 30 still fulcruming about the pull plate 40, however. Also, while not quite so obvious, the handle is susceptible to use in pushing the truck when in this position, a greater downward pressure on the hand grip section pivoting the handle about the pull plate 40 in such manner that the additional pressural engagement of the leg 30 with said plate permits a forward component of force to be applied to the truck and in this way the truck may be pushed, even though the horizontal projection of the handle is not very large.

The solid line position of the handle pictured in Figure 4 represents the lowest angular position into which the handle can be moved, such a limited position being governed by the free end of the leg 52, for in this position the leg 32 abuts the upper end of this leg. It can readily be seen that the truck may be conveniently pulled when the handle is so positioned, inasmuch as there is thus produced an appreciable horizontal component of the handle. The truck, however, may also be pushed, since, as in the dotted line shown in this figure, all that need be done is to exert a larger amount of downward force against the hand grip sections 24, which in this instance causes the bight 34 to ride hard against the pull plate 40, actually abutting the rear portions of the aperture 42 so that when the handle is pushed upon the rear edge of the aperture such rear edge shoulders a great amount of the pushing load. Because of this latter condition, existent during pushing, not so much downward pressure need be exerted as when the handle is in the intermediate position represented by the dotted line relation shown in Figure 4. Of course, the several handle positions described and illustrated are only representative, there being any number of shaded gradations possible between these selected positions.

As hereinbefore indicated, the handle when in its most vertical position is maintained at approximately an angle of five degrees with respect to the vertical, but a further safety feature is provided in the form of a block 56 secured to the frame 16 adacent each leg 30, whereby the handle can never be moved beyond the vertical, even when making an adjustment by raising the handle so that its U-shaped ends are uppermost, such as when adjusting the handle into the position shown in Figure 4. Any such movement past a vertical position is both unnecessary and hazardous, inasmuch as it permits possible contact of the worker's hands with any stacked material resting upon the truck. Accordingly, affixed to the forward part of the frame 16 and upright relative to the pull plate 40 is a stop block 56, the forward face of which is in substantial alignment with the rear edge of the aperture 42, thereby arresting any angular movement of the handle beyond a vertical position as it is in the process of being adjusted.

Another feature inherent in the described construction is that the entire truck may be rocked by means of the handle mechanism B to shift the rear wheels 12 angularly with respect to the forward wheels 14, as might be desired at times, particularly when operating in restricted quarters. To do this, the handle member 26 is moved into the solid line position pictured in Figure 2 and is pulled toward the person, i. e. to the left as viewed in this figure, the person perhaps employing his foot to prevent movement of the truck in his direction. This action, of course, causes the rear end of the truck to rise slightly, and repeated actions such as this with a concomitant torsional twist applied to the hand grip sections 24 will result in the desired angular movement of the truck. In this connection, since the arms 26 spread apart and each lower end thereof is U-shaped, it will be recognized that the torsional force is applied at spaced locations which facilitate the above described truck movement.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a handle mechanism, the combination comprising an upwardly facing concave member including diverging side portions, an elongated handle member including a curved lower portion cradled within said concave member, a support overhanging said concave member, and an aperture in said support providing a fulcrum for said handle member, the angle of divergence of said side portions being such as to engage said curved lower portion and limit pivoting motion of said handle member about said fulcrum.

2. In a handle mechanism, the combination comprising a bracket having a curved bottom portion and diverging leg portions, a pull plate connected to said bracket and provided with an aperture opposite said curved bottom portion, and an elongated handle member including a shank and a substantially U-shaped lower end forming a bight and a pair of spaced leg portions, one of said handle leg portions being slidably and pivotally disposed in said aperture for fulcruming of said handle member by said plate, the angle of divergence of said bracket leg portions being such as to limit movement of said U-shaped end when the handle member is pivoted.

3. In a handle mechanism, the combination comprising a bracket having a curved bottom portion and diverging leg portions, a pull plate connected to said bracket and provided with an aperture overhanging said curved bottom portions, and an elongated handle member including a shank and a substantially U-shaped lower end forming a bight and a pair of spaced leg portions, one of said handle leg portions passing through said aperture for fulcruming of said handle member by said plate, the angle of divergence of said bracket leg portions being such as to limit pivoting movement of said U-shaped end when the handle member is pivoted, the upper end of one of said bracket leg members being disposed so as to abut the handle leg portion adjacent thereto when said handle member is pivoted into its lowermost angular position.

4. In a handle mechanism, the combination comprising a bracket having a curved bottom portion, a pull plate connected to said bracket and provided with an aperture overhanging said curved bottom portion, and an elongated handle member including a shank and a substantially U-shaped lower end forming a bight and a pair of spaced leg portions, one of said handle leg portions passing through said aperture for fulcruming of said handle member by said plate, upstanding leg portions on said bracket being spaced to limit pivotal movement of said U-shaped end when the handle member is pivoted, said aperture being offset from the center of curvature of said curved bottom portion to prevent said handle member from assuming an upright position.

References Cited in the file of this patent

UNITED STATES PATENTS

| 1,850,326 | Kelly | Mar. 22, 1932 |

FOREIGN PATENTS

| 727,525 | France | Mar. 29, 1932 |